United States Patent [19]

Torii

[11] Patent Number: 4,848,765
[45] Date of Patent: Jul. 18, 1989

[54] SHEET FEED MECHANISM

[75] Inventor: Shumpeita Torii, Kanagawa, Japan

[73] Assignee: Fuji Photo Film Co., Inc., Kanagawa, Japan

[21] Appl. No.: 152,725

[22] Filed: Feb. 5, 1988

[30] Foreign Application Priority Data

Feb. 6, 1987 [JP] Japan .................................. 62-26798

[51] Int. Cl.⁴ .............................................. B65H 5/06
[52] U.S. Cl. .................................................. 271/274
[58] Field of Search ......................... 271/272, 273, 274

[56] References Cited

U.S. PATENT DOCUMENTS 2,377,525  6/1945  Schutt ................................... 271/274
3,618,934  11/1971  Germuska ............................. 271/274
4,179,112  12/1979  Breuers ............................ 271/272 X

FOREIGN PATENT DOCUMENTS 41569  3/1980  Japan .................................... 271/274

Primary Examiner—Richard A. Schacher
Attorney, Agent, or Firm—Sughrue, Mion, Zinn, Macpeak & Seas

[57] ABSTRACT

A sheet feed mechanism is used in a device including a mechanism for applying a light beam to a scanned sheet to scan the same two-dimensionally for reading image information from or recording image information on the sheet. The sheet feed mechanism includes a curved feed passage disposed downstream of the mechanism for feeding the sheet therethrough, at least one roller pair disposed on the feed passage, a displacing unit for moving rollers of the roller pair toward and away from each other, and a drive source for driving the rollers to feed the sheet while the rollers displaced toward each other by the displacing unit for gripping the sheet.

11 Claims, 4 Drawing Sheets

FIG. 4
(a)
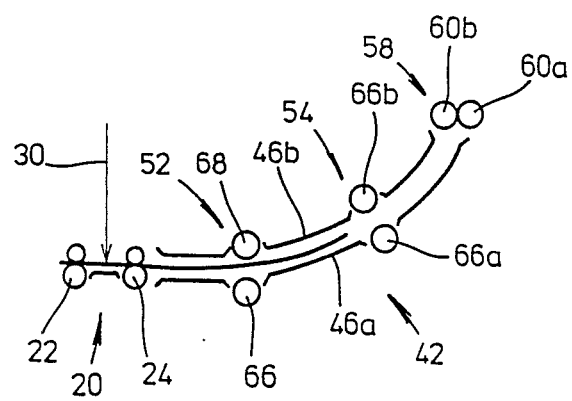
(b)
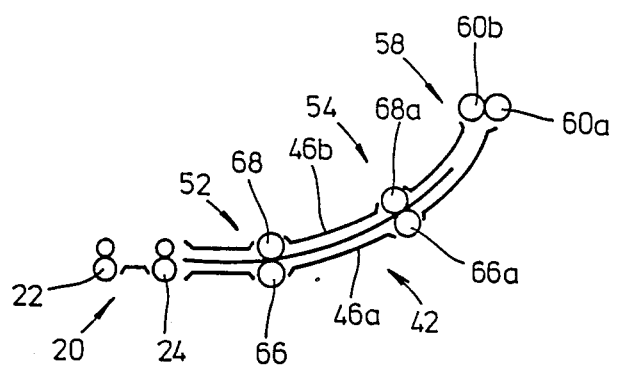

SHEET FEED MECHANISM

BACKGROUND OF THE INVENTION

The present invention relates to a sheet feed mechanism, and more particularly to a sheet feed mechanism for use in a device for applying a laser beam to a scanned member such as a stimulable phosphor sheet, for example, to read an image recorded thereon, the sheet feed mechanism including a pair of rollers movable into curved passage for delivering the scanned member therethrough after the image has been read from the scanned member, the rollers being retracted from the passage away from each other while the image is being read from the scanned member, so that precise image information can be reproduced without imposing unwanted shocks on the scanned member during the image reading process, the sheet feed mechanism being arranged to reduce the size of the device.

There has recently been developed and widely used a radiation image recording and reproducing system for producing the radiation-transmitted image of an object using a stimulable phosphor material capable of emitting light upon exposure to stimulating rays. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The radiation image recording and reproducing system includes an image reading device for reading the radiation image recorded on a stimulable phosphor sheet. The image reading device reads the radiation image as follows:

The stimulable phosphor sheet is two-dimensionally scanned by a light beam such as a laser beam, and light emitted from the stimulable phosphor sheet in response to application of the light beam is detected in time series by a light detector such as a photomultiplier or the like, for thereby obtaining image information. The two-dimensional scanning of the stimulable phosphor sheet with the light beam is effected by mechanially feeding the stimulable phosphor sheet in one direction with a belt conveyor or the like for auxiliary scanning, while deflecting the light beam for main scanning in a direction normal to the direction in which the stimulable phosphor sheet is fed.

The image information thus obtained is sent to an image recorder. In the image recorder, a photographic photosensitive material serving as a recording material is exposed to a laser beam modulated by the image information produced from the stimulable phosphor sheet for recording an image on the photographic photosensitive material. The photographic photosensitive material with the image recorded thereon is then transferred to an image developing device and processed thereby to develop the image. The photographic photosensitive material is thereafter stored in a prescribed place for use in medical diagnosis when required.

Stimulable phosphor sheets of different sizes are used to meet various needs or applications. If stimulable phosphor sheets are to be fed stably and smoothly in the image reading device from the time when the image starts being read to the time when the image reading is finished, then a feed path of a length which is about twice the length of the maximum-size sheet. As a result, the image reading device takes up a large installation space.

One solution to the above drawback is to have a sheet feed passage curved upwardly. The curved sheet feed passage requires a plurality of drive roller pairs spaced as feed sources at intervals therealong which should be smaller than the length of stimulable phosphor sheets of a minimum size.

While a stimulable phosphor sheet is being scanned to read the image recorded thereon, the leading end, which has been scanned, of the sheet is shocked when it is gripped by a pair of drive rollers disposed in the curved sheet feed passage. The shock thus applied to the stimulable phosphor sheet tends to adversely affect the scanning process for the remaining portion of the sheet. More specifically, when the stimulable phosphor sheet being scanned is accidentally displaced by a shock, no accurate image can therafter be read from the sheet, and no desired radiation image information can be reproduced. If inaccurate image information is used for medical diagnosis, a diagnostic error may be caused.

SUMMARY OF THE INVENTION

It is a general object of the present invention to provide a sheet feed mechanism having a pair of rollers disposed in a curved passage for gripping and feeding therethrough a sheet such as a stimulable phosphor sheet, a photographic photosensitive material, or the like used for image reading or recording, the rollers being spaced from the sheet while the sheet is being scanned and movable to grip and feed the sheet after the sheet has been scanned, so that the sheet is free from unwanted shocks while being scanned for thereby allowing an image to be read from or recorded on the sheet accurately, the sheet feed mechanism being arranged to reduce the size of a device for reading the image from or recording the image on the sheet.

A major object of the present invention is to provide a sheet feed mechanism for use in a device including a mechanism for applying a light beam to a scanned sheet to scan the same two-dimensionally for reading image information from or recording image information on the sheet, the sheet feed mechanism comprising: a curved feed passage disposed downstream of the mechanism for feeding the sheet therethrough; at least one roller pair disposed on the feed passage; displacing means for moving both rollers of the roller pair toward and away from each other; and a drive source for driving the rollers to feed the sheet when the rollers displaced toward each other by the displacing means are gripping the sheet.

Another object of the present invention is to provide a sheet feed mechanism wherein the curved feed passage comprises a pair of guide members substantially spaced from each other and having a plurality of openings through which the rollers of the roller pair are movable toward each other into the feed passage.

Still another object of the present invention is to provide a sheet feed mechanism wherein the guide members having opposite ends and opposite inner edges which define the openings, in a direction in which the sheet is fed, the opposite ends and the opposite inner edges being bent away from the confronting guide members, respectively.

Yet another object of the present invention is to provide a sheet feed mechanism wherein the roller pair comprises a pair of shafts and the rollers mounted respectively on the shafts and movable into the openings.

Yet still another object of the present invention is to provide a sheet feed mechanism wherein the displacing means comprises a cam member displaceably disposed between a pair of shafts of the roller pair, a drive source for displacing the cam member one direction, and a resilient member attached to the cam member for normally urging the cam member in an opposite direction.

A further object of the present invention is to provide a sheet feed mechanism wherein the cam member has a pair of slanted cam surfaces converging toward each other, the slanted cam surfaces engaging the shafts, respectively, for moving the rollers toward and away from each other.

A still further object of the present invention is to provide a sheet feed mechanism wherein a plurality of roller pairs are disposed along the feed passage, the roller pairs having respective pairs of shafts between which respective cam members are disposed, the displacing means further including a plurality of filamentary members having ends joined to the cam members, respectively, and opposite ends connected to the drive source, whereby the cam members can be displaced in response to operation of the drive source.

A yet further object of the present invention is to provide a sheet feed mechanism wherein the drive source comprises a rotative drive source, the displacing means further including an arm having one end operatively coupled to the rotative drive source and an opposite end connected to the filamentary members.

A yet still further object of the present invention is to provide a sheet feed mechanism wherein a plurality of roller pairs are disposed along the feed passage, further including rotation transmitting means operatively coupled to the drive source and the roller pairs for rotating the roller pairs in synchronism.

Still another object of the present invention is to provide a sheet feed mechanism wherein the rotation transmitting means comprises a plurality of sprockets mounted on respective shafts of rollers of the roller pairs and a chain trained around the sprockets in driving relation.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 4a and 4b are schematic views showing operation of the sheet feed mechanism of the present invention.

DETAILED DESCRIPTION OF THE PREFERRED EMBODIMENT

Figure 1:
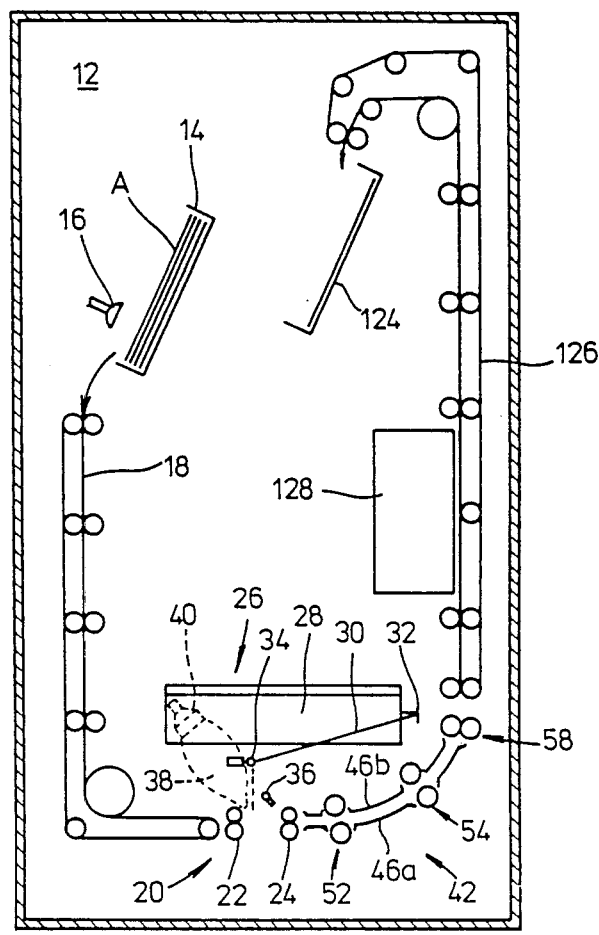
FIG. 1 is a schematic view of an image reading device having incorporated therein a sheet feed mechanism according to the present invention.

FIG. 1 shows an image reading device 10 incorporating a sheet feed mechanism according to the present invention. The image reading device 10 has a chamber 12 therein which accommodates a supply magazine 14 loaded therein. The supply magazine 14 stores a stack of stimulable phosphor sheets A on which radiation images are recorded. A sheet delivery mechanism including a suction cup 16 is disposed near the supply magazine 14 in the chamber 12. Below the suction cup 16, there is disposed a first endless feed belt 18 for feeding a stimulable phosphor sheet A. The first feed belt 18 extends vertically downwardly and is bent so as to be directed horizontally at an inner corner of the image reading device 10. The first feed belt 18 has a terminal end which is slightly spaced from an auxiliary scanning feed means 20 comprising a roller pair 22 and a roller pair 24.

The auxiliary scanning feed means 20 is positioned below a reader 26 including a laser beam source 28 for emitting a laser beam, which is reflected by a mirror 32 and a galvanometer mirror 34 to scan a stimulable phosphor sheet A in the auxiliary scanning feed means 20. The auxiliary scanning feed means 20 also includes a light collecting mirror 36 for reflecting light emitted from the stimulable phosphor sheet A toward a light guide 38 which is disposed above the scanned position on the stimulable phosphor sheet A and extends along a main scanning line. The light guide 38 has an upper end on which a photomultiplier 40 is mounted.

A sheet feed mechanism 42 according to the present invention is disposed near the roller pair 24 of the auxiliary scanning feed means 20.

Figure 2:
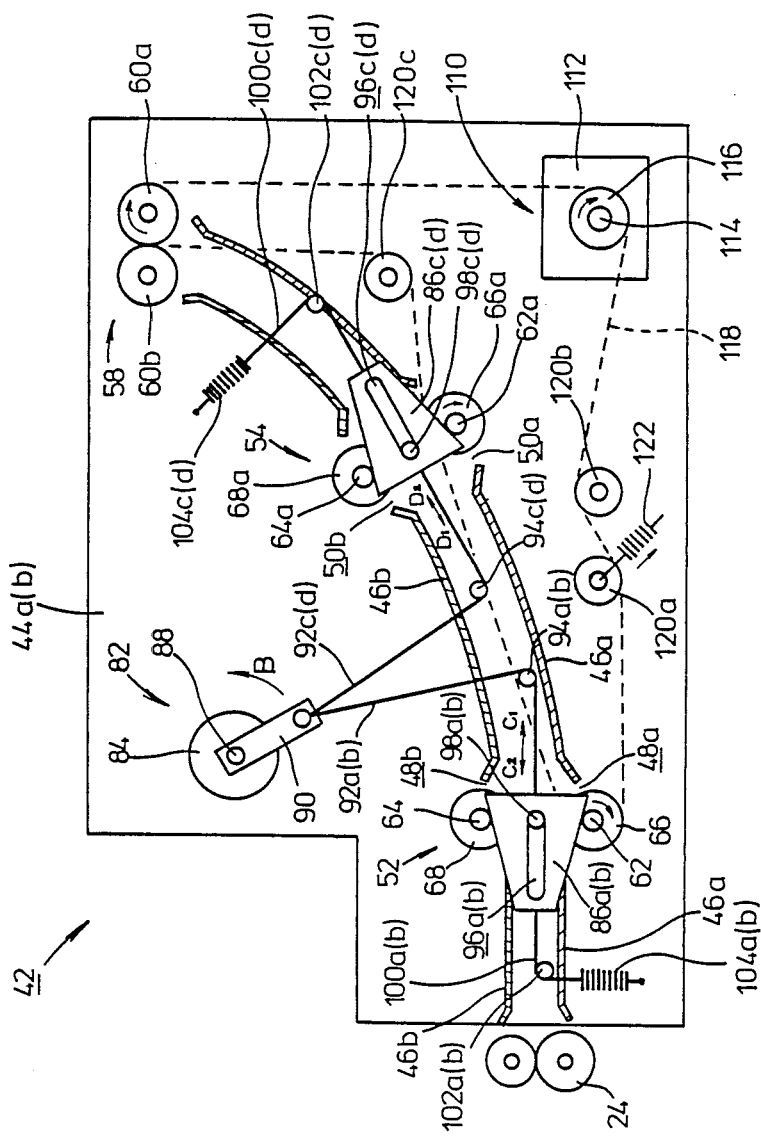
FIG. 2 is a side elevational view, partly in cross section, of the sheet feed mechanism of the present invention.
Figure 3:
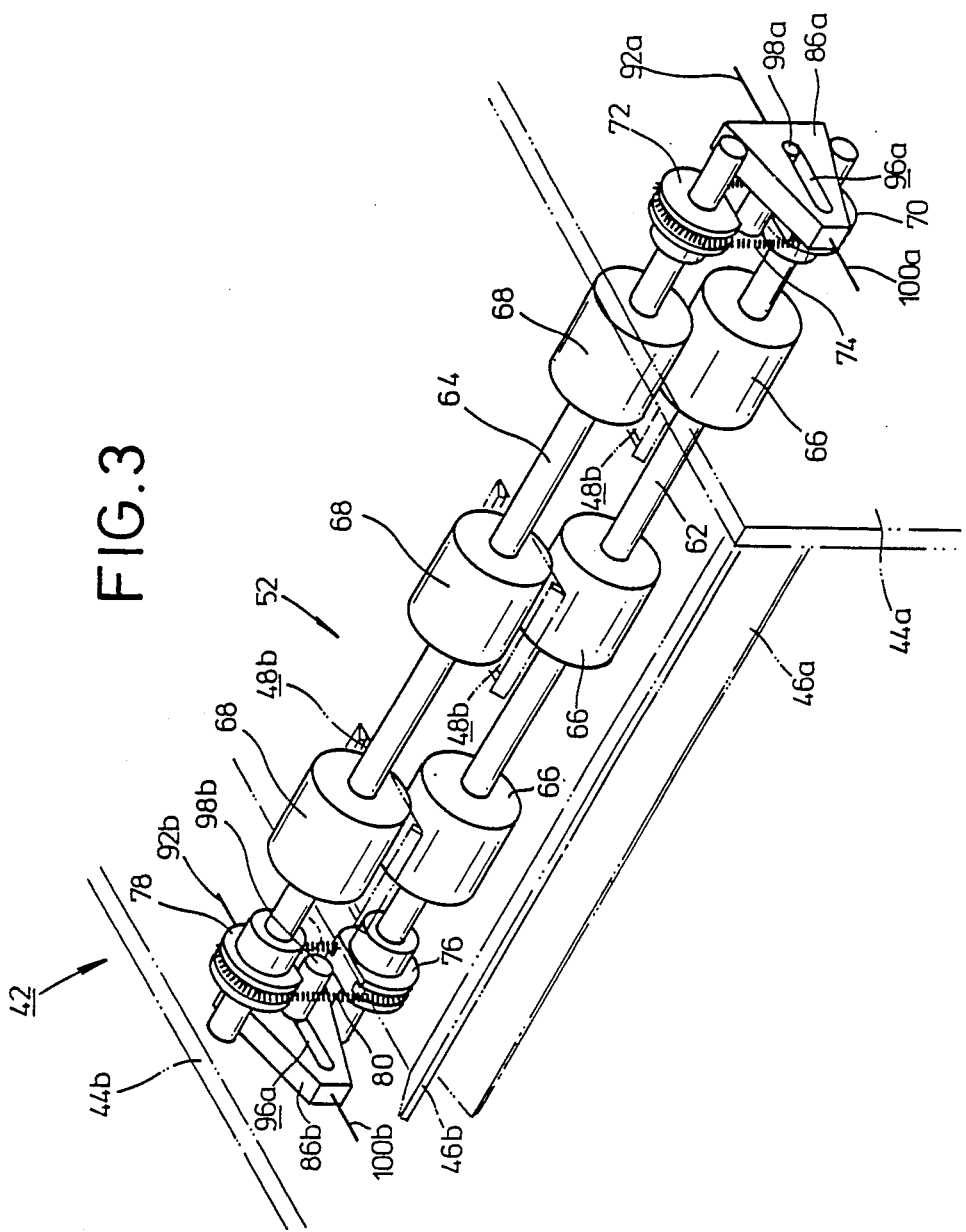
FIG. 3 is a perspective view of the sheet feed mechanism of the present invention.

More specifically, as shown in FIGS. 2 and 3, the sheet feed mechanism 42 includes a pair of plates 44a, 44b horizontally spaced from each other and between which a pair of curved guide plates 46a, 46b is supported. The guide plates 46a, 46b have respective arrays of spaced openings 48a, 48b, and also respective arrays of spaced openings 50a, 50b defined substantially centrally therein (FIG. 2). The opposite ends of the guide plates 46a, 46b and opposite inner edges thereof which define the openings 48a, 48b, 50a, 50b, in the direction in which the stimulable phosphor sheet A is fed, are bent outwardly away from the confronting plates 46b, 46a, respectively.

First and second roller pairs 52, 54 are disposed respectively in the openings 48a, 48b; 50a, 50b, and a third roller pair 38 is disposed at the end of the guide plates 46a, 46b remotely from the roller pair 24. The third roller pair 58 comprises a roller 60a drivable by a rotative drive source (described later) and a roller 60b held in rolling contact therewith.

The first and second roller pairs 52, 54 are substantially identical in structure to each other, and hence only the first roller pair 52 will be described in detail. Parts of the second roller pair 54 are denoted by the same reference numerals, with a suffix a, as those of the first roller pair 52, and will not be described in detail.

As illustrated in FIG. 3, the first roller pair 52 includes a pair of shafts 62, 64 spaced from each other and plural rollers 66, 68 mounted respectively on the shafts 62, 64. The rollers 66, 68 are disposed so that they are movable into the openings 48a, 48b, respectively, in the guide plates 46a, 46b. The shafts 62, 64 have ends fitted respectively in bearings 70, 72 movably mounted on the plate 44a and extend through the bearings 70, 72. The bearings 70, 72 have smaller-diameter portions engaging in the plate 44a and larger-diameter portions partly cut away and having grooves defined in their outer peripheral surfaces. An endless coil spring 74 is trained under tension around the larger-diameter portions in and along the grooves thereof The other ends of the shafts 62, 64 are also supported in respective bearings 76, 78 movably mounted on the plate 44b. The bearings 76, 78 have larger-diameter portions around which a spring 80 is trained under tension. Therefore, the shafts 62, 64 are normally urged toward each other under the tension of the springs 74, 80 to bring the rollers 66, 68 into rolling contact with each other. The shafts 62, 64 are displaceable away from each other by a displacing means (described below).

The sheet feed mechanism 42, FIG. 2, has a displacing means 82 for displacing the rollers 66, 68 of the first roller pair 52 and the rollers 66a, 68a of the second roller pair 54 away from each other. More specifically, the displacing means 82 includes a rotative drive source 84, and cam members 86a through 86d engaging the opposite ends of the shafts 62, 64 and 62a, 64a of the roller pairs 52, 54. The rotative drive source 84 has a rotatable drive shaft 88 to which one end of an arm 90 is attached. The other end of the arm 90 is coupled to wires 92a through 92d that are joined to ends of the cam members 86a through 86d, respectively. The wires 92a through 92d have intermediate portions trained around and bent by pulleys 94a through 94d, respectively.

The cam member 86a is of a substantially trapezoidal shape when viewed in plan and has two slanted cam surfaces converging toward each other and engaging the ends of the shafts 62, 64, respectively. The cam member 86a has a slot 96a defined substantially centrally therein, and a pin 98a engages in the slot 96a. The pin 98a is mounted on the plate 44a to limit the amount of displacement of the cam member 86a. To the other end of the cam member 86a, there is connected one end of a wire 100a which is trained around a pulley 102a, the other end of the wire 100a being coupled to a tension spring 104a. Therefore, when the drive source 84 is energized to turn the arm 90 in the direction of the arrow B, the cam member 86a is displaced by the wire 92a in the direction of the arrow C1 to allow the shafts 62, 64 to move toward each other until the rollers 66, 68 are in rolling contact with each other and held in rolling contact by springs 74, 80. When the arm 90 is returned to its original position as shown in FIG. 2, the cam member 86a is moved back under the resiliency of the tension spring 104a in the direction of the arrow C2, thereby camming the shafts 62, 64 apart, with the result that the rollers 66, 68 are detached from rolling contact with each other The interval which the shafts 62, 64 can be displaced toward and away from each other may be adjusted by selecting the angle of inclination of the slanted cam surfaces of the cam member 86a.

The other cam members 86b through 86d are of substantially the same structure as that of the cam member 86a. Parts of the cam members 86b through 86d are denoted by the same reference numerals, with suffixes b through d, respectively, as those of the cam member 86a, and will not be described in detail.

The sheet feed mechanism 42 also includes a drive means 110 (see FIG. 2) for driving the first through third roller pairs 52, 54, 58. The drive means 110 includes a rotative drive source 112 having a drive shaft 114 on which a sprocket 116 is mounted. A chain 118 is trained around the sprocket 116 and sprockets attached to the rollers 66, 66a, 60a of the first through third roller pairs 52, 54, 58. The chain 118 is held in mesh with other sprockets 120a through 120c. The sprocket 120 is normally urged in the direction of the arrow by means of a tension spring 122 coupled thereto. Therefore, when the rollers 66, 66a around which the chain 118 is trained are displaced, the sprocket 120a is also displaced while being kept under tension by the tension spring 122. The chain 118 is thus pulled under constant tension at all times.

As shown in FIG. 1, a feed belt 126 is disposed above the third roller pair 58 of the sheet feed mechanism 42 for feeding the stimulable phosphor sheet A to a receiver magazine 124. An erasing unit 128 is disposed in confronting relation to an intermediate portion of the feed belt 126. The erasing unit 128 contains a plurality of erasure light sources.

The image reading device incorporating the sheet feed mechanism of the invention therein is basically of the above construction. Operation and advantages of the image reading device and the sheet feed mechanism will now be described below.

First, the supply magazine 14 is loaded in the image reading device 10, the supply magazine 14 containing a stack of stimulable phosphor sheets A, for example, with radiation images of objects such as human bodies being recorded thereon.

One of the stimulable phosphor sheets A at a time is taken out of the supply magazine 14 by the sheet delivery mechanism including the suction cup 16, and fed to the auxiliary scanning feed means 20 by the first feed belt 18 disposed below the suction cup 16. In the auxiliary scanning feed means 20, the stimulable phosphor sheet A is gripped by the roller pairs 22, 24 to move in an auxiliary scanning direction.

At the same time, the reader 26 is energized to enable the laser beam source 28 to emit the laser beam 30, which is reflected by the mirror 32 to reach the galvanometer mirror 34. The galvanometer mirror 34 is angularly moved to scan the stimulable phosphor sheet A with the laser beam 30 in the main scanning direction. Light emitted from the stimulable phosphor sheet A in response to exposure to the laser beam 30 is applied directly or via the mirror 36 to the light guide 38, and then converted to an electric signal by the photomultiplier 40. The electric signal is then supplied to an image recorder, for example. The stimulable phosphor sheet A is therefore two-dimensionally scanned by the laser beam 30.

As the image reading process goes on, the leading end of the stimulable phosphor sheet A enters a curved sheet feed passage defined between the guide plates 46a, 46b of the sheet feed mechanism 42. At this time, the rollers 66, 68 of the first roller pair 52 are spaced from each other, and the rollers 66a, 68a of the second roller pair 54 are also spaced from each other. More specifically, as shown in FIG. 2, the rotative drive source 84 of the displacing means 82 is de-energized to hold the arm 90 mounted on the drive shaft 88 in the illustrated original position. The cam members 86a, 86b are displaced in the direction of the arrow C2 under the tension of the springs 104a, 104b, and the cam members 86c, 86d are displaced in the direction of the arrow D2 under the tension of the springs 104c, 104d.

In response to such displacement of the cam members 86a through 86d, the shafts 62, 64 and 62a, 64a engaging the slanted cam surfaces of the cam members 86a, 86b and 86c, 86d are displaced away from each other against the tension of the springs 74, 80 and similar springs (not shown) acting on the shafts 62a, 64a. The rollers 66, 68 of the first roller pair 52 are therefore moved away from each other out of the sheet feed passage, and so are the rollers 66a, 68a of the second roller pair 54. Therefore, the leading end of the stimulable phosphor sheet A as it enters the sheet feed passage does not contact the first and second roller pairs 52, 54. Consequently, the stimulable phosphor sheet A is not subjected to unwanted shocks which would otherwise be imposed by contact with the first and second roller pairs 52, 54, and the image information recorded on the stimulable phosphor sheet A can accurately be read out by the image reader 26 (see FIG. 4a).

After the recorded image has been read out, the rollers 66, 68 of the first roller pair 52 are displaced toward each other, and so are the rollers 66a, 68a of the second roller pair 54. More specifically, the rotative drive source 84 of the displacing means 82 is energized to turn the arm 90 in the direction of the arrow B (FIG. 2). The wires 92a through 92d attached to the arm 90 are now pulled to displace the cam members 86a, 86b in the direction of the arrow C1 against the tension of the tension springs 104a, 104b and also to displace the cam members 86c, 86d in the direction of the arrow D1 against the tension of the tension springs 104c, 104d. As a result, the slanted cam surfaces of the cam members 86a, 86b and 86c, 86d permit the rollers 66, 68 of the first roller pair 52 and the rollers 66a, 68a of the second roller pair 54 to be displaced toward each other under the bias of the springs 74a, 74b and the other similar springs. The first and second roller pairs 52, 54 thus grip the stimulable phosphor sheet A substantially centrally in the sheet feed passage between the guide plates 46a, 46b (see FIG. 4b).

Then, the rotative drive source 112 is energized to rotate the drive shaft 114 and hence the sprocket 116 in the direction of the arrow, causing the chain 118 trained around the sprocket 116 to rotate the rollers 66, 66a, 60a of the first through third roller pairs 52 through 58 in synchronism in the direction of the arrows. The stimulable phosphor sheet A gripped by the first and second roller pairs 52, 54 is now fed through the sheet feed passage until the leading end of the stimulable phosphor sheet A is gripped by the third roller pair 58.

As described above, the opposite ends of the guide plates 46a, 46b and the opposite inner edges thereof which define the openings 48a, 48b, 50a, 50b in the direction of feed of the stimulable phosphor sheet A are bent outwardly away from the confronting guide plates 46b, 46a. Therefore, the stimulable phosphor sheet A is smoothly fed in the sheet feed passage without contacting the guide plates 46a, 46b, thereby allowing the recorded image to be read from the sheet A highly accurately.

The stimulable phosphor sheet A gripped by the third roller pair 58 is carried by the feed belt 126 to the erasing unit 128 (FIG. 1). In the erasing unit 128, the erasure light sources are energized to emit light that is applied to the stimulable phosphor sheet A to discharge remaining radiation energy from the sheet A. Therefore, any remaining image is completely erased from the stimulable phosphor sheet A. The stimulable phosphor sheet A from which the radiation image has been erased by the erasing unit 128 is delivered by the feed belt 126 into an upper portion of the image reading device 10 in which the sheet A is stored in the receiver magazine 124.

After the stimulable phosphor sheet A has passed through the sheet feed mechanism 42, the rollers 66, 68 of the first roller pair 52 and the rollers 66a, 68a of the second roller pair 54 are displaced away from each other in the manner described above in preparation for arrival of a next stimulable phosphor sheet A.

With the arrangement of the present invention, as described above, a sheet feed passage for passing a sheet therethrough for reading or recording image information is defined by a pair of curved guide plates, and at least one roller pair is provided for feeding the sheet that has entered the sheet feed passage, the rollers of the roller pair being movable toward and away from each other. While the sheet is being scanned for reading or recording the image, the rollers are moved away from each other out of the sheet feed passage to prevent an unwanted shock from being applied to the sheet. After the sheet has been scanned, the rollers are displaced toward each other into the sheet feed passage to grip and feed the sheet through the sheet feed passage. Since no shock is imposed on the sheet while it is being scanned, the sheet is accurately scanned for image reading or recording. Moreover, inasmuch as the sheet feed passage is of a curved configuration, the image reading device in which the sheet feed mechanism is disposed may be small in size.

The principles of the present invention are also applicable to a sheet feed mechanism for use in an image recording device in which an image is recorded on a photographic photosensitive material by applying an information-modulated light beam thereto.

Although a certain preferred embodiment has been shown and described, it should be understood that many changes and modifications may be made therein without departing from the scope of the appended claims.

What is claimed is:

1. A sheet feed mechanism for use in a device including a mechanism for applying a light beam to a scanned sheet to scan the same in a main scanning direction transverse to an auxiliary scanning direction of the sheet for reading image information from or recording image information on the sheet, said sheet feed mechanism comprising: a curved feed passage disposed downstream of said mechanism for feeding the sheet therethrough in said auxiliary scanning direction; at least one roller pair consisting of a pair of shafts mounting respective rollers disposed on said feed passage; displacing means for moving both rollers of said roller pair toward and away from each other from a first, detached position out of contact with said sheet as it moves into said sheet feed passage by said sheet feed mechanism and a second roller sheet gripping position; and a drive source for driving said rollers to feed the sheet after said rollers are displaced toward each other by said displacing means and are gripping said sheet, and wherein said displacing means comprises detaching means for keeping both said rollers in said detached position while said sheet is being scanned to prevent shock to the sheet during two-dimensional scanning, said detaching means being displacably disposed between said pair of shafts of said roller pair.

2. A sheet feed mechanism according to claim 1, wherein said curved feed passage comprises a pair of guide members substantially spaced from each other and having a plurality of openings through which said rollers of the roller pair are movable toward each other into and out of said feed passage.

3. A sheet feed mechanism according to claim 2, wherein said guide members having opposite ends and opposite inner edges which define said openings, in a direction in which said sheet is fed, said opposite ends and said opposite inner edges being bent away from the confronting guide members, respectively.

4. A sheet feed mechanism according to claim 2, wherein said roller pair comprises a pair of shafts and said rollers mounted respectively on said shafts and movable into said openings.

5. A sheet feed mechanism according to claim 1, wherein said detaching means further a cam member displaceably disposed between said pair of shafts of said roller pair, a drive source for displacing said cam member in one direction, and a resilient member attached to said cam member for normally urging said cam member in an opposite direction.

6. A sheet feed mechanism according to claim 5, wherein said cam member has a pair of slanted cam surfaces converging toward each other, said slanted cam surfaces engaging said shafts, respectively, for moving said rollers toward and away from each other.

7. A sheet feed mechanism according to claim 5 or 6, wherein a plurality of roller pairs are disposed along said feed passage, said roller pairs having respective pairs of shafts between which respective cam members are disposed, said displacing means further including a plurality of filamentary members having ends joined to said cam members, respectively, and opposite ends connected to said drive source, whereby said cam members can be displaced in response to operation of said drive source.

8. A sheet feed mechanism according to claim 7, wherein said drive source comprises a rotative drive source, said displacing means further including an arm having one end operatively coupled to said rotative drive source and an opposite end connected to said filamentary members.

9. A sheet feed mechanism according to claim 1, wherein a plurality of roller pairs are disposed along said feed passage, further including rotation transmitting means operatively coupled to said drive source and said roller pairs for rotating said roller pairs in synchronism.

10. A sheet feed mechanism according to claim 9, wherein said rotation transmitting means comprises a plurality of sprockets mounted on respective shafts of rollers of said roller pairs and a chain trained around said sprockets in driving relation.

11. A sheet feed mechanism for use in a device including a mechanism for applying a light beam to a scanned sheet to scan the same in a main scanning direction transverse to an auxiliary scanning direction for reading image information from or recording image information on the sheet, said sheet feed mechanism comprising; a curved feed passage disposed downstream of said mechanism for feeding the sheet therethrough in said auxiliary scanning direction; at least one roller pair disposed on said feed passage; displacing means for moving each of said rollers of said roller pair toward and away from each other; and a drive source for driving said rollers to feed the sheet after said rollers have been displaced toward each other by said displacing means and have gripped said sheet.

* * * * *